US011944084B1

(12) United States Patent
Norbits (10) Patent No.: US 11,944,084 B1
(45) Date of Patent: Apr. 2, 2024

(54) POST MOUNTED ITEM HOLDER

(71) Applicant: G. Theodore Norbits, Mt. Zion, IL (US)

(72) Inventor: G. Theodore Norbits, Mt. Zion, IL (US)

(*) Notice: Subject to any disclaimer, the term of this patent is extended or adjusted under 35 U.S.C. 154(b) by 0 days.

(21) Appl. No.: 18/241,339

(22) Filed: Sep. 1, 2023

(51) Int. Cl.
*A01K 97/06* (2006.01)
*A01K 97/10* (2006.01)
*A01K 87/00* (2006.01)
*A01K 97/18* (2006.01)

(52) U.S. Cl.
CPC ............. *A01K 97/10* (2013.01); *A01K 97/06* (2013.01); *A01K 87/009* (2022.02); *A01K 97/18* (2013.01)

(58) Field of Classification Search
CPC ... A01K 97/10; F16B 2/08; F16B 2/00; F16B 2/02
USPC .......... 248/230.8, 511, 534, 535, 538, 5, 39, 248/540, 222.12, 229.17; 43/21.2; 63/3, 63/3.1, 3.2
See application file for complete search history.

(56) References Cited

U.S. PATENT DOCUMENTS

| | | | | |
|---|---|---|---|---|
| 4,768,741 A * | 9/1988 | Logsdon | ................. | E21F 17/02 248/230.8 |
| 5,078,279 A * | 1/1992 | Hancock | ............... | A47F 7/0035 211/70.5 |
| 5,465,930 A * | 11/1995 | Wu | ............................ | B62B 1/06 24/484 |
| 5,573,211 A * | 11/1996 | Wu | .......................... | B62B 1/06 248/230.8 |
| 5,651,633 A * | 7/1997 | Howe | ..................... | E04H 15/64 403/392 |
| 6,019,324 A * | 2/2000 | Wu | .......................... | B62B 1/045 280/DIG. 6 |
| 6,637,707 B1 * | 10/2003 | Gates | .................... | A47B 96/061 248/222.12 |
| 6,929,223 B2 * | 8/2005 | Hancock | ................ | F16M 13/00 224/462 |
| 8,800,938 B2 * | 8/2014 | Heath | ..................... | F16L 3/085 403/395 |
| 8,882,072 B2 * | 11/2014 | Hattori | .................. | B29C 45/006 248/65 |
| 8,955,198 B2 * | 2/2015 | Carnevali | .......... | B65D 63/1063 24/17 AP |
| 9,182,069 B2 * | 11/2015 | Haarburger | .......... | F16M 11/041 |
| 10,982,731 B2 * | 4/2021 | Hancock | ............... | F16M 13/022 |
| 2007/0247858 A1 * | 10/2007 | Ford | ..................... | F21V 21/088 362/382 |
| 2013/0068900 A1 * | 3/2013 | Heath | ..................... | F16L 3/137 248/70 |
| 2014/0259567 A1 * | 9/2014 | Colak | ....................... | G09F 7/06 24/484 |
| 2014/0268710 A1 * | 9/2014 | Murano | .................... | F16B 2/22 362/382 |

(Continued)

OTHER PUBLICATIONS

Norbits, Design U.S. Appl. No. 29/818,488, filed Dec. 9, 2021.

(Continued)

*Primary Examiner* — Darren W Ark
*Assistant Examiner* — Katelyn T Truong
(74) *Attorney, Agent, or Firm* — Philip L. Bateman (57) ABSTRACT

An item holder is adapted for mounting onto a post. The item holder has a hemicylindrical body that conforms to the shape of a post. An assembly of two cylinders and one elastic cord secures the body to the post.

10 Claims, 9 Drawing Sheets

(56) References Cited

U.S. PATENT DOCUMENTS

| | | | |
|---|---|---|---|
| 2015/0165986 A1* | 6/2015 | Morris | B60R 21/20 |
| | | | 248/505 |
| 2018/0179780 A1* | 6/2018 | Dershem | E04H 15/644 |
| 2020/0072392 A1* | 3/2020 | Foerg | F16L 3/13 |

OTHER PUBLICATIONS

Norbits, Design U.S. Appl. No. 29/824,025, filed Jan. 21, 2022.
Norbits, Design U.S. Appl. No. 29/843,251, filed Jun. 20, 2022.
Norbits, Design U.S. Appl. No. 29/859,412, filed Nov. 10, 2022.
Norbits, Design U.S. Appl. No. 29/860,388, filed Nov. 18, 2022.

\* cited by examiner

FIG. 12

POST MOUNTED ITEM HOLDER

FIELD OF THE INVENTION

This invention relates to fishing. More particularly, this invention relates to item holders for mounting onto posts on fishing boats.

BACKGROUND OF THE INVENTION

Fishing is practiced for obtaining food and for recreation. Recreational fishermen commonly fish from boats and use a wide variety of rods, tools, and other items. Many different holders for these items have been disclosed.

Figure 1:
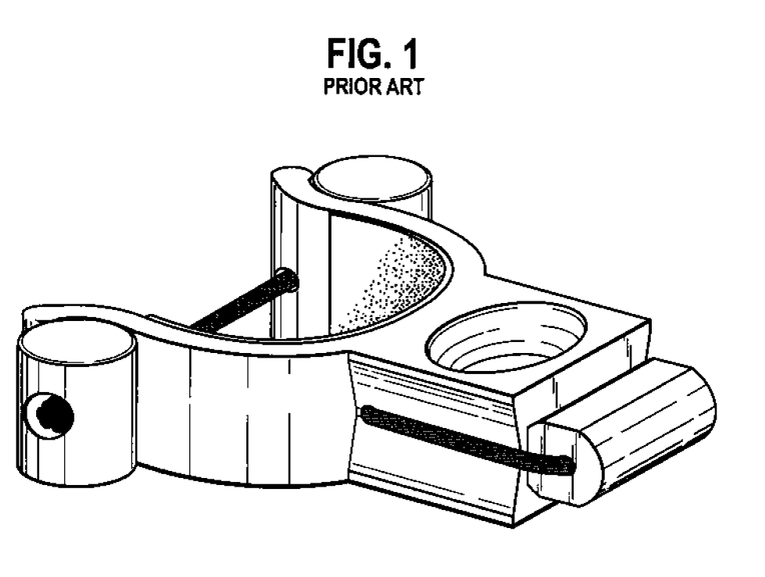
FIG. 1 is a first example of an item holder especially suited for holding a dehooker.

A first group of item holders contain mounts for attachment to a vertical post on a fishing boat. An example of such an item holder is shown in FIG. 1. The item holder attaches to a post and holds a dehooker. The post mounted item holder contains a hemicylindrical body that partially surrounds a post. A hemicylinder is a cylinder divided lengthwise. A hemicylinder is also described as a cylinder divided in the direction of its axis. The outer edges of the hemicylinder are tapered outwardly so they will retain two cylinders (also known as barrels) holding the ends of an elastic cord. The item holder is held onto the post with a single section of elastic cord. The two cylinders are on opposite sides of the body with the elastic cord passing through a hole in one of the outer edges of the body so the cylinders and cord cannot be separated from the body and lost. The item holder requires the cutting of a notch in one outer edge and a hole in the other outer edge during manufacture.

Item holders of this type are disclosed in the following pending design patent applications of G. Theodore Norbits: (1) U.S. design patent application Ser. No. 29/824,025, Jan. 21, 2022, entitled "Telephone Holder"; (2) U.S. design patent application no. 29/843,251, Jun. 20, 2022, entitled "Tool Holder"; and (3) U.S. design patent application Ser. No. 29/859,412, Nov. 10, 2022, entitled "Dehooker Holder." All of these design patents applications are incorporated by reference in their entireties.

The Norbits item holders are useful, but have only a single elastic cord to stretch across the side of the post opposite the hemicylindrical body. The item holders are prone to slippage on the post if the elastic cord loses some of its elasticity, if the item being held is especially heavy, or if the post is especially low in friction due to the presence of oil or other liquid.

Figure 2:
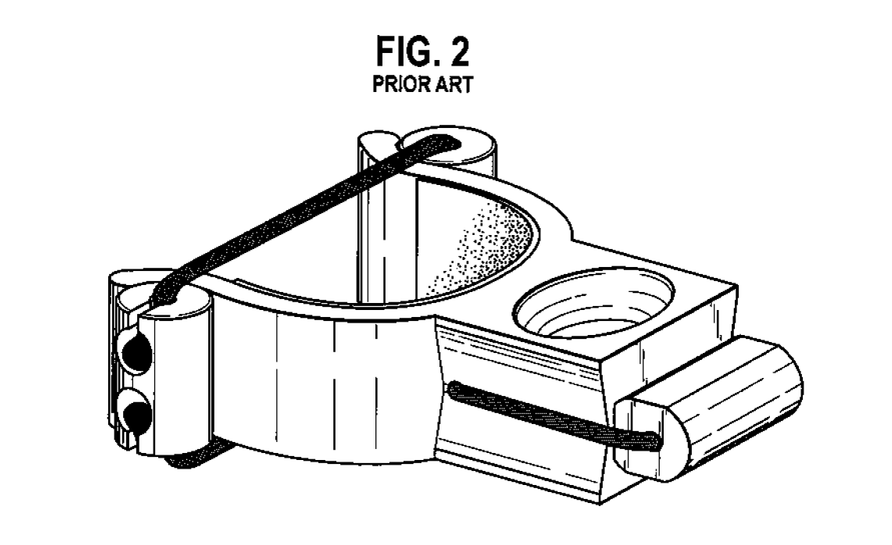
FIG. 2 is a second example of an item holder especially suited for holding a dehooker.
Figure 3:
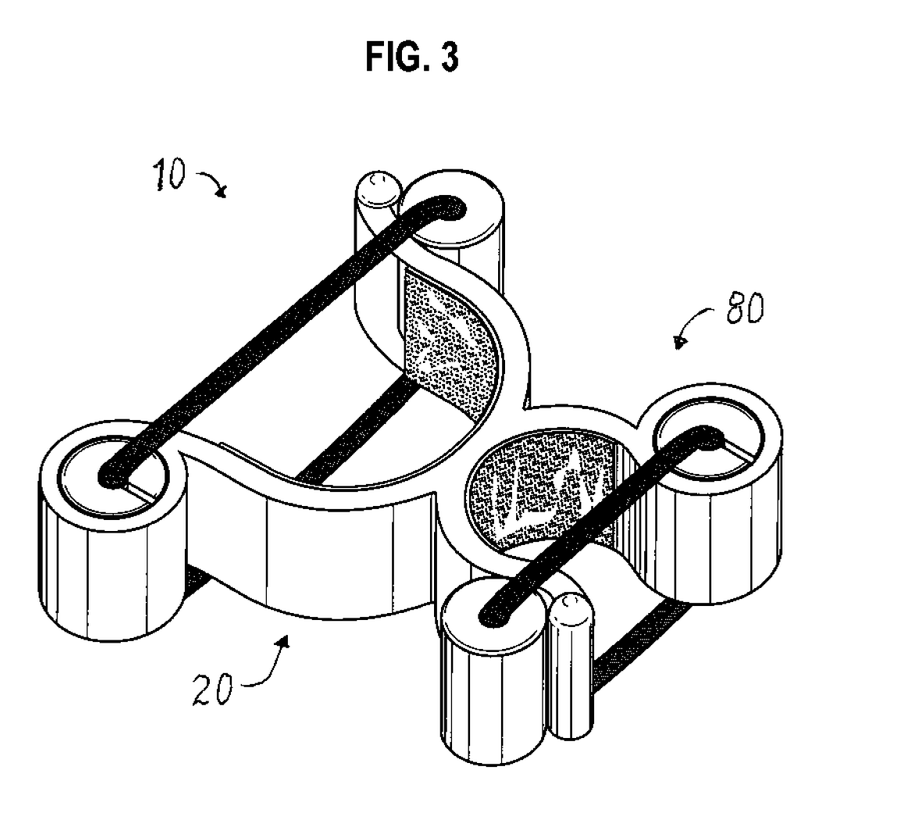
FIG. 3 is a front, top, and left side perspective view of a preferred embodiment of the post mounted item holder of this invention in a closed position.
Figure 4:
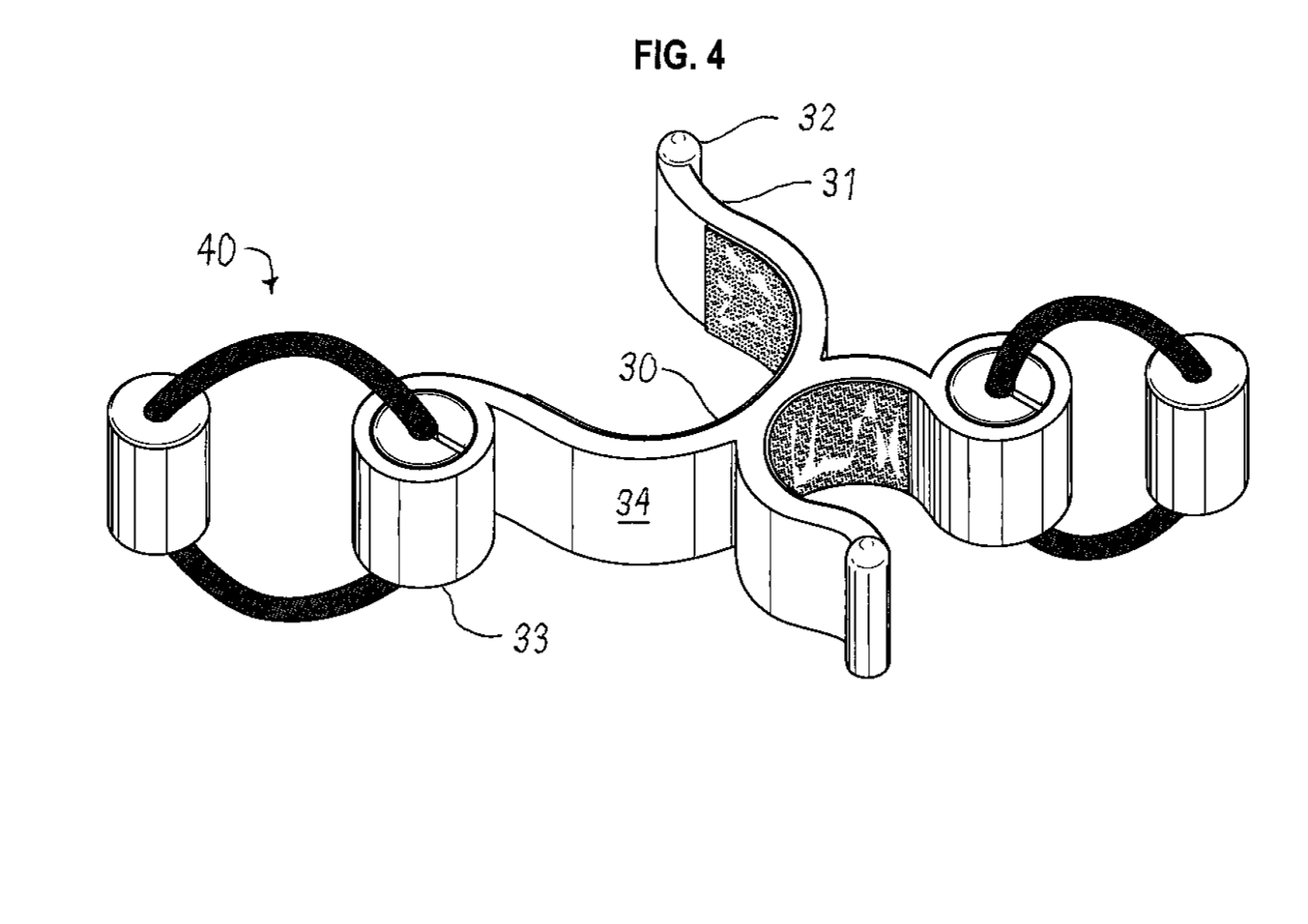
FIG. 4 is a front, top, and left side perspective view thereof in an open and unattached position.
Figure 5:
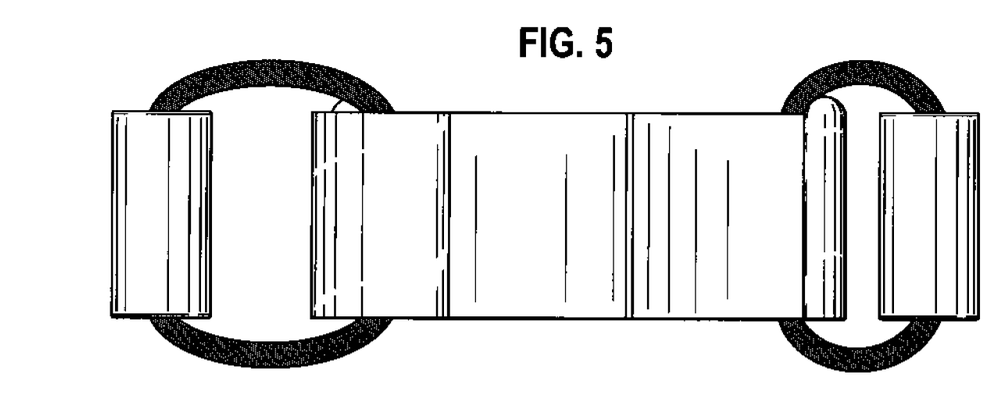
FIG. 5 is a left side elevation view thereof.
Figure 6:
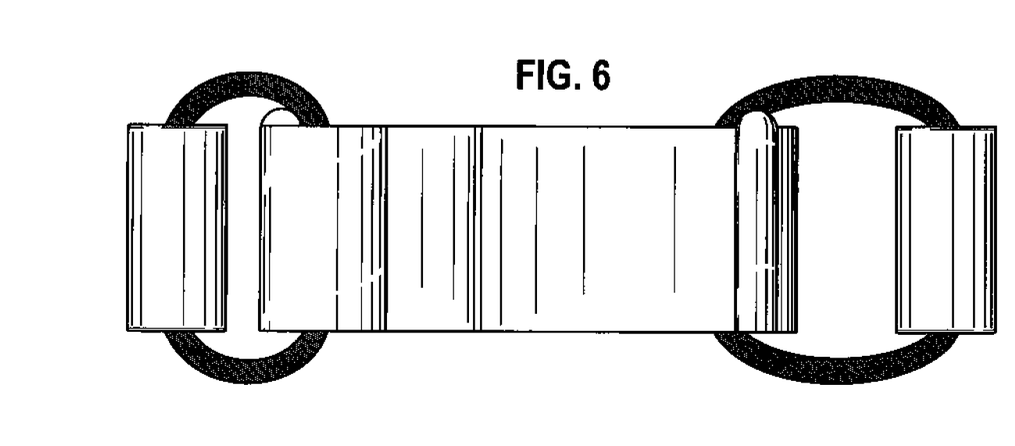
FIG. 6 is a right side elevation view thereof.
Figure 7:
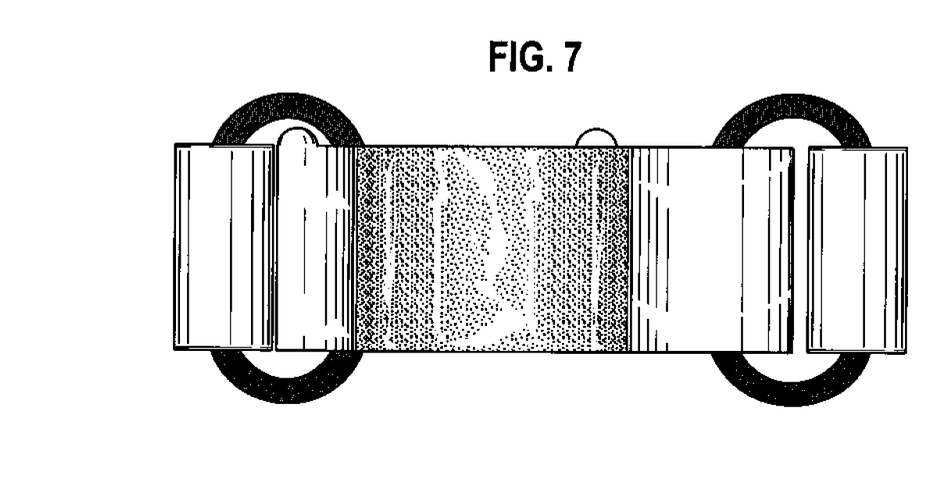
FIG. 7 is a rear elevation view thereof.
Figure 8:
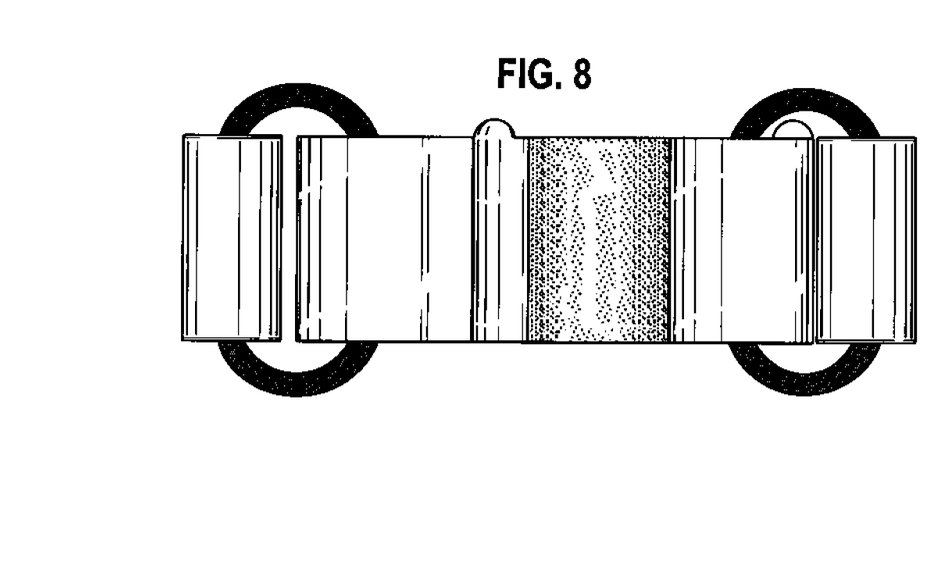
FIG. 8 is a front elevation view thereof.
Figure 9:
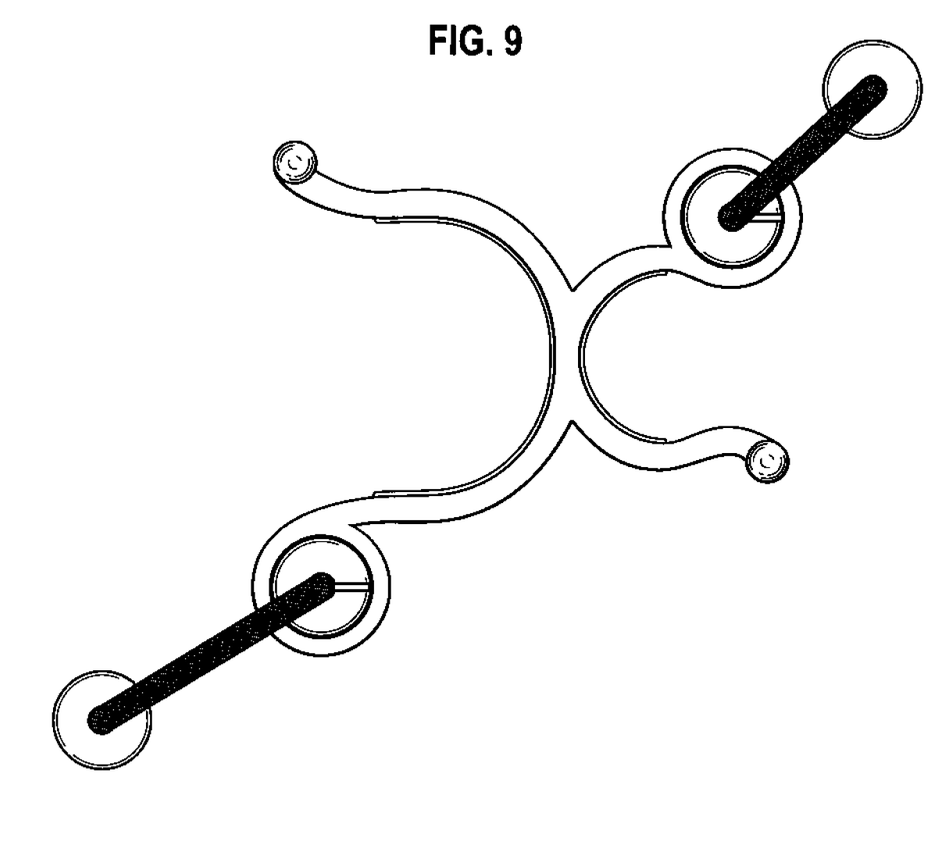
FIG. 9 is a top plan view thereof.
Figure 10:
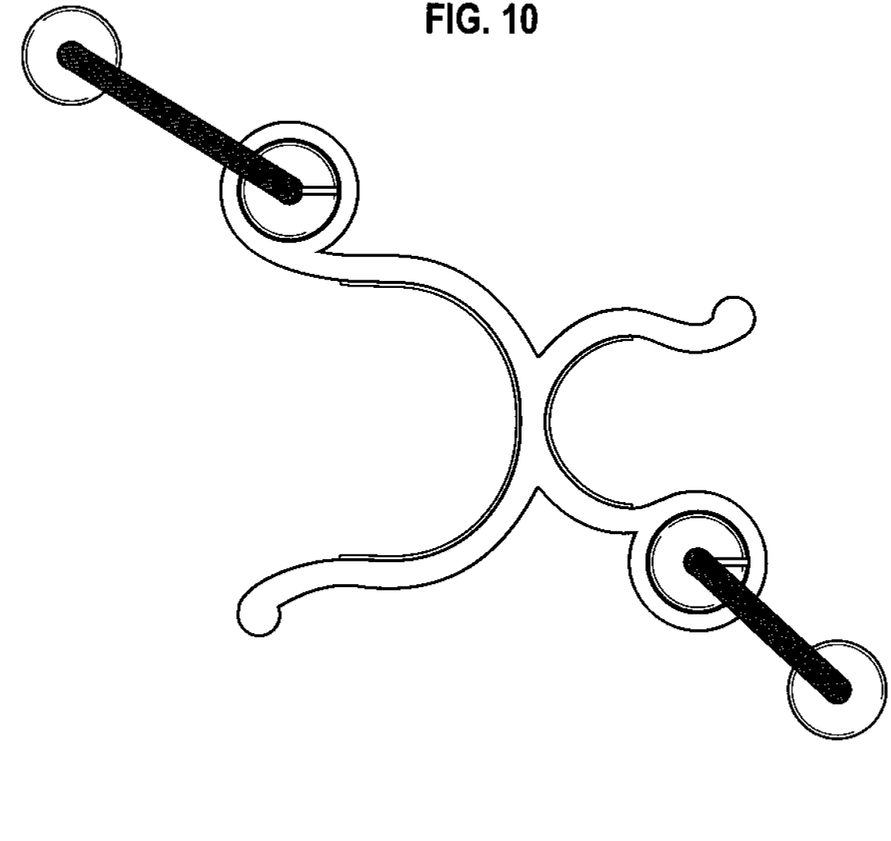
FIG. 10 is a bottom plan view thereof.

A second group of item holders contain mounts that have two sections of elastic cord on the side of the post opposite the hemicylindrical body. An example of such an item holder is shown in FIG. 2. The item holder contains two cylinders, each of which has a longitudinal passageway. An elastic cord passes through both cylinders. The ends of the cord are attached to one of the cylinders in keyhole openings to form a loop. These item holders provide a stronger grip to the pole than item holders having only a single elastic cord opposite the hemicylindrical body. However, the cord loop can be separated from the body and misplaced or lost.

Accordingly, there is a demand for a post mounted item holder that is held onto a post with two sections of cord, that has a cord that cannot be separated from the body and lost, and that does require the cutting of a notch or a hole during manufacture.

SUMMARY OF THE INVENTION

The general object of this invention is to provide an improved post mounted item holder. A more particular object is to provide a post mounted item holder that is held onto a post with two sections of cord, that has a cord that cannot be separated from the body and lost, and that does require the cutting of a notch or a hole.

I have invented an improved post mounted item holder. The post mounted item holder comprises: (a) a mount comprising: (i) a hemicylindrical body having a height, an outer surface, a first outer edge curving outwardly, and a second outer edge comprising a vertical sleeve; and (ii) a loop comprising: (1) a first cylinder having a height about equal to the height of the hemicylindrical body, an upper keyhole opening, and a lower keyhole opening, the first cylinder being positioned within the vertical sleeve of the hemicylindrical body; (2) a second cylinder having a height about equal to the height of the hemicylindrical body, a longitudinal passageway, and a solid side wall, the second cylinder having an unattached position adjacent the sleeve of the hemicylindrical body and an attached position against the outwardly curving outer edge of the hemicylindrical body; and (3) an elastic cord passing through the second cylinder and having a first enlarged end in the upper keyhole opening of the first cylinder and a second enlarged end in the lower keyhole opening of the first cylinder such that the elastic cord forms the loop, the elastic cord having a length such that tension is created when the second cylinder is in the attached position; and (b) an item holder connected along the outer surface of the hemicylindrical body of the mount.

The post mounted item holder of this invention is held onto a post with two sections of cord, that has a cord that cannot be separated from the body and lost, and that does require the cutting of a notch or a hole during manufacture.

DETAILED DESCRIPTION OF THE INVENTION

1. The Invention in General

This invention is best understood by reference to the drawings. Referring to FIGS. 3 to 12, the post mounted item holder of this invention 10 contains two portions, a mount 20 for attachment to a post and a holder 80 for an item. A preferred embodiment of the post mounted item holder of this invention is especially suited for holding a fishing rod. In this embodiment, the mount and the item holder are similar in structure because a post and a fishing rod are both cylindrical. The item holder portions are different in structure in other embodiments because they are adapted for holding non-cylindrical items. In other words, every embodiment of the item holder has a mount that is the same or similar while the portion that holds the item varies considerably.

2. The Post Mount Portion

The post mount portion 20 consists of a hemicylindrical body 30 and a loop 40. The body is shaped to conform to the outer surface of a post. The diameter of the body is sized to conform to the post to which it will be attached. The diameter is typically about one to three inches and is preferably about two inches. The term "about" is used herein to mean plus or minus 25 percent of the measurement or other quantified property referenced. The height of the body is typically about one to two inches and is preferably about one and one-half inches. The body contains a first outer edge 31 that curves outwardly. The end of the first outer edge is slightly enlarged to form a post 32. The body contains a second outer edge 33 that comprises a vertical sleeve. As discussed below, the outer edges of the body hold the cylinders of the loop. The outer surface 34 of the body forms a vertex located about equal distance from the two outer edges. As discussed below, the item holder is connected to the outer surface of the body and is preferably connected along the vertex.

The body is generally made of a durable thermoplastic such as acrylonitrile butadiene styrene (ABS), polylactic acid (PLA), polyvinyl alcohol (PVA), and the like. The inner surface of the body is preferably covered with a pad that provides a better grip against a pole. The body is typically manufactured by injection molding or by additive manufacturing (using a three-dimensional printer).

Figure 12:
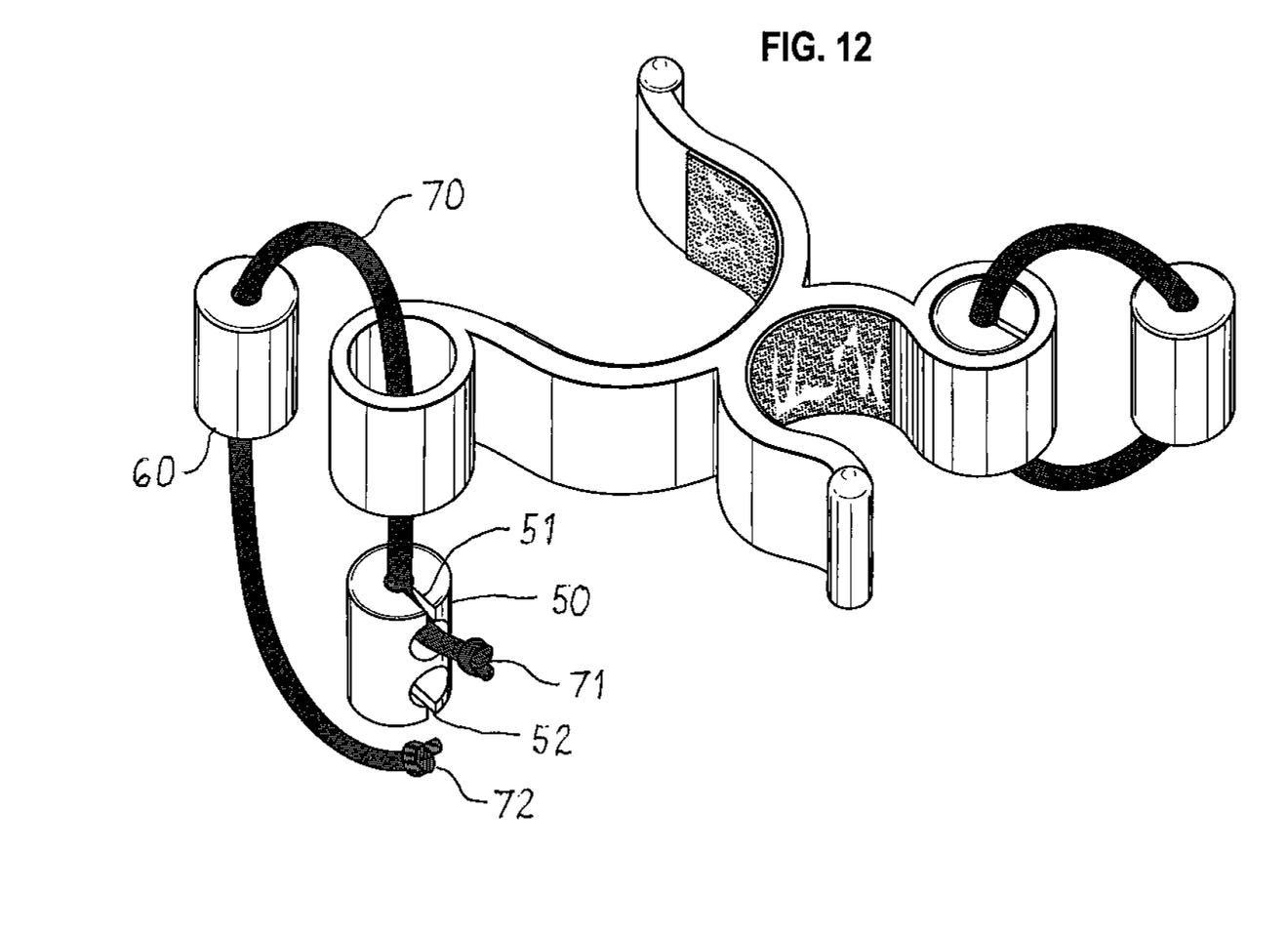
FIG. 12 is a front, top, and left side perspective view thereof showing partial assembly.

The loop 40 consists of a first cylinder 50, a second cylinder 60, and an elastic cord 70. The first cylinder has a height that is about equal to the height of the body. As best seen in FIG. 12, the first cylinder contains an upper keyhole opening 51 and a lower keyhole opening 52 into which the ends of the elastic cord are inserted. The first cylinder is positioned inside the vertical sleeve of the body during use. The second cylinder also has a height that is about equal to the height of the body. The second cylinder has a longitudinal passageway for the elastic cord that runs the entire length of the cylinder. The second cylinder has a solid side wall. The elastic cord passes through the second cylinder. The elastic cord has a first enlarged end 71 that is inserted into the upper keyhole of the first cylinder and a second enlarged end 72 that is inserted into the lower keyhole opening of the first cylinder. The enlarged ends of the cord are created by knots or the like. The length of the cord is determined by the dimensions of the body and by the desired amount of tension on the cord when in the attached position. The diameter of the cord is preferably about one-eighth to one-quarter inch.

The loop is assembled as shown in FIG. 12. The cord is passed through the second cylinder. The enlarged ends on the cord are then created. The enlarged ends are then inserted into the upper and lower keyhole openings of the first cylinder. The loop is then rotated to move the first cylinder into the vertical sleeve of the body where the enlarged ends of the cord in the keyhole openings are constrained.

The loop has two positions. In the open and unattached position shown in FIGS. 4 to 10, the second cylinder is adjacent the sleeve of the body. The term "adjacent" is used herein to mean in relatively close proximity because the cord is relaxed (i.e., not stretched). In this position, the body is ready for placement against a post. In the closed and attached position shown in FIGS. 3 and 11, the second cylinder is against the outwardly curving outer edge of the body. Moving the second cylinder from the unattached position to the attached position is performed after the body is placed against a post. Moving the second cylinder creates tension in the elastic cord and holds the body tightly against the post. The cord is free to move within the second cylinder to equalize the tension on both sections of the cord pressing against the post.

Alternate embodiments of the loop are suitable. In one alternate embodiment, the loop comprises two cylinders that have longitudinal passageways and a continuous elastic cord (a cord with attached ends). In another embodiment, the ends of the elastic cord are attached permanently to the top and bottom of the first cylinder with an adhesive or with a fastener. In another embodiment, one elastic cord extends between the tops of the two cylinders and a second elastic cord extends between the bottoms of the two cylinders. In this embodiment, the two elastic cords are conveniently attached to upper and lower keyhole openings in both cylinders. In the preferred embodiment, both cylinders have heights about equal to the height of the body. Lesser and greater heights are suitable, but do not function as well and are less aesthetically pleasing.

3. The Item Holder Portion

Figure 11:
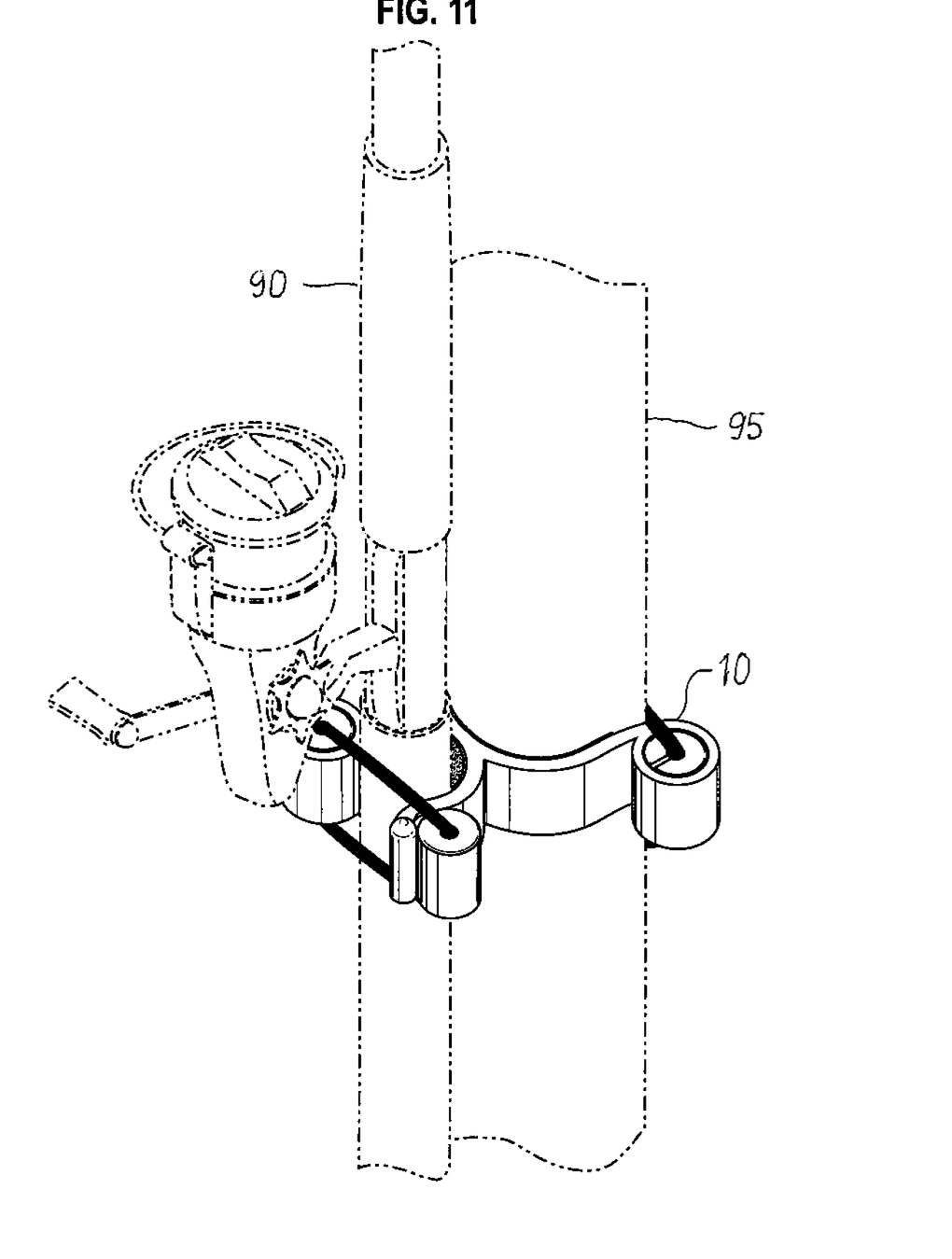
FIG. 11 is front, top, and right side perspective view thereof showing attachment to a post and holding of a fishing rod.

The item holder portion 80 is connected to the outer surface of the body. The structure of the item holder is a matter of choice that depends on the item that is to be held. In the embodiment shown in FIGS. 3 to 12, the item holder is a holder for a cylindrical fishing rod that is connected along the vertex of the body. A fishing rod is a cylindrical object, as is the post to which the post mounted item holder is attached. Accordingly, the structure of the item holder portion is similar to the post holder portion. In the preferred embodiment, the two portions differ only in size because fishing rods are of a smaller diameter than posts. Referring to FIG. 11, a fishing rod 90 is shown in broken lines being held by the item holder that is, in turn, attached to a post 95 shown in broken lines.

A variety of other item holders are suitable. For example, suitable item holders are telephone holders as disclosed in Norbits, U.S. design patent application Ser. No. 29/824,025, Jan. 21, 2022; tool holders as disclosed in Norbits, U.S. design patent application Ser. No. 29/843,251, Jun. 20, 2022; and dehooker holders as disclosed in Norbits, U.S. design patent application Ser. No. 29/859,412, Nov. 10, 2022, and as shown in FIGS. 1 and 2. Other suitable item holders include lure holders, clip holders, cord retainers, and the like. The item holder portion is incorporated as part of the post mount portion if desired. The combined weight of the item holder portion and the item itself preferably does not exceed the ability of the post mount portion to remain in position on the post.

The item holder portion is preferably manufactured with the post mount portion as an integral unit. If desired, the item holder is connected to the post mount portion using fasteners, adhesives, or the like. If desired, different item holders are interchangeably connected to the post mount portion. If desired, the item holder is rotatable relative to the post mount portion so the item being held is at an angle relative to the post. If rotatable, notches or the like are advantageously added to the mating surfaces to secure the item holder at the desired angle.

4. Use And Advantages

The use of the post mounted item holder of this invention can now be considered. The post mounted item holder is conveniently attached on any post of the desired size. The post is generally vertical, but horizontal and sloped posts are also suitable. Fishing boats generally contain multiple posts, enabling a fisherman to place the post mounted item holder at a convenient location.

The post mounted item holder of this invention is held onto a post with two sections of cord, thus providing a strong grip on the pole and reducing the possibility of slippage. The holder has a cord that cannot be separated from the body and lost. The cord is easily replaced if it is damaged or loses its elasticity. The holder does not require the cutting of a notch or a hole during manufacture.

I claim:

1. A post mount comprising:
   (a) a hemicylindrical body having a height, an outer surface, an outwardly curving first outer edge, and a second outer edge comprising a vertical sleeve; and
   (b) a closed loop comprising:
      (i) a first cylinder having a top and a bottom, the top being an upper circular base, an upper keyhole opening extending into the upper circular base, the bottom being a lower circular base, a lower keyhole opening extending into the lower circular base, and the first cylinder being positioned within the vertical sleeve of the hemicylindrical body;
      (ii) a second cylinder having a top and a bottom, the second cylinder having an unattached position adjacent the vertical sleeve of the hemicylindrical body and an attached position against the outwardly curving first outer edge of the hemicylindrical body; and
      (iii) an elastic cord with a first end and a second end, the first end located in the upper keyhole opening and the second end located in the lower keyhole opening, the elastic cord extending between the top of the first cylinder and the top of the second cylinder and extending between the bottom of the first cylinder and the bottom of the second cylinder to form the loop, the elastic cord having a length such that tension is created when the second cylinder is in the attached position;
      such that the closed loop is inseparable from the hemicylindrical body when the closed loop is assembled with the elastic cord extending between the top of the first cylinder and the top of the second cylinder and extending between the bottom of the first cylinder and the bottom of the second cylinder to form the closed loop and the first cylinder within the vertical sleeve of the hemicylindrical body.

2. The post mount of claim 1 wherein the first cylinder has an upper keyhole opening and a lower keyhole opening and wherein the elastic cord has a first enlarged end in the upper keyhole opening of the first cylinder and a second enlarged end in the lower keyhole opening of the first cylinder.

3. A post mounted item holder comprising:
   (a) a mount comprising:
      (i) a hemicylindrical body having a height, an outer surface, a first outer edge curving outwardly, and a second outer edge comprising a vertical sleeve; and
      (ii) a closed loop comprising:
         (1) a first cylinder having a top and a bottom, the top being an upper circular base, an upper keyhole opening extending into the upper circular base, the bottom being a lower circular base, a lower keyhole opening extending into the lower circular base, and the first cylinder being positioned within the vertical sleeve of the hemicylindrical body;
         (2) a second cylinder having a top and a bottom, the second cylinder having an unattached position adjacent the vertical sleeve of the hemicylindrical body and an attached position against the first outer edge curving outwardly of the hemicylindrical body; and
         (3) an elastic cord with a first end and a second end, the first end located in the upper keyhole opening and the second end located in the lower keyhole opening, the elastic cord extending between the top of the first cylinder and the top of the second cylinder and extending between the bottom of the first cylinder and the bottom of the second cylinder to form the loop, the elastic cord having a length such that tension is created when the second cylinder is in the attached position;
         such that the closed loop is inseparable from the hemicylindrical body when the closed loop is assembled with the elastic cord extending between the top of the first cylinder and the top of the second cylinder and extending between the bottom of the first cylinder and the bottom of the second cylinder to form the closed loop and the first cylinder within the vertical sleeve of the hemicylindrical body, and
   (b) an item holder connected along the outer surface of the hemicylindrical body of the mount.

4. The post mounted item holder of claim 3 wherein the item holder comprises a fishing rod holder, a telephone holder, a tool holder, a dehooker holder, a lure holder, or a clip holder.

5. The post mounted item holder of claim 3 wherein the first outer edge is slightly enlarged to form a post.

6. A post mounted item holder comprising:
   (a) a mount comprising:
      (i) a hemicylindrical body having a height, an outer surface, a first outer edge, and a second outer edge comprising a vertical sleeve having a cylindrical side wall and an open top and an open bottom; and
      (ii) a closed loop comprising:
         (1) a first cylinder having an upper circular base, a lower circular base, and a height about equal to the height of the hemicylindrical body, an upper keyhole opening extending into the upper circular base, and a lower keyhole opening extending into the lower circular base, the first cylinder being positioned within the vertical sleeve of the hemicylindrical body;
         (2) a second cylinder having an upper circular base, a lower circular base, and a height about equal to the height of the hemicylindrical body, a longitudinal passageway extending from the upper circular base to the lower circular base, and a solid side wall, the second cylinder having an unattached position adjacent the vertical sleeve of the hemicylindrical body and an attached position against the first outer edge of the hemicylindrical body; and
         (3) an elastic cord passing through the longitudinal passageway of the second cylinder and having a first enlarged end in the upper keyhole opening of the first cylinder and a second enlarged end in the lower keyhole opening of the first cylinder to form the closed loop and to conceal the first enlarged end and the second enlarged end within the vertical sleeve, the elastic cord having a length such that tension is created when the second cylinder is in the attached position;

such that the closed loop is inseparable from the hemicylindrical body when the closed loop is assembled with the first enlarged end of the elastic cord in the upper keyhole opening of the first cylinder, the second enlarged end of the elastic cord in the lower keyhole opening of the first cylinder, the elastic cord passing the through the longitudinal passageway of the second cylinder, and the first cylinder within the vertical sleeve of the hemicylindrical body, and (b) an item holder connected along the outer surface of the hemicylindrical body of the mount.

7. The post mounted item holder of claim 1 wherein the item holder comprises a fishing rod holder having the same hemicylindrical body and the same loop as the mount.

8. The post mounted item holder of claim 1 wherein the hemicylindrical body has an inner surface and additionally comprising a pad on the inner surface.

9. The post mounted item holder of claim 1 wherein the first enlarged end of the elastic cord and the second enlarged end of the elastic cord are knots.

10. The post mounted item holder of claim 1 wherein the outer surface of the hemicylindrical body has a vertex and wherein the item holder is connected to the hemicylindrical body along the vertex.

\* \* \* \* \*